United States Patent [19]

Greco et al.

[11] Patent Number: 5,625,676
[45] Date of Patent: Apr. 29, 1997

[54] METHOD AND APPARATUS FOR MONITORING A CALLER'S NAME WHILE USING A TELEPHONE

[75] Inventors: Robert C. Greco; Michael J. Robinson, both of Seattle; Paul M. Dunn, Bainbridge Island, all of Wash.

[73] Assignee: Active Voice Corporation, Seattle, Wash.

[21] Appl. No.: 474,335

[22] Filed: Jun. 7, 1995

Related U.S. Application Data

[63] Continuation-in-part of Ser. No. 119,380, Sep. 13, 1993, Pat. No. 5,434,906, and Ser. No. 125,606, Sep. 22, 1993, abandoned.

[51] Int. Cl.⁶ .................................................. H04M 1/64
[52] U.S. Cl. .......................... 379/88; 379/67; 379/96; 379/201
[58] Field of Search ........................ 379/201, 210, 379/211, 212, 215, 265, 266, 309, 67, 88, 90, 93, 96

[56] References Cited

U.S. PATENT DOCUMENTS

| | | | |
|---|---|---|---|
| 4,544,804 | 10/1985 | Herr et al. | 379/210 |
| 4,661,975 | 4/1987 | Brecher | 379/211 |
| 4,696,028 | 9/1987 | Morganstein et al. | 379/212 |
| 4,697,282 | 9/1987 | Winter et al. | 379/84 |
| 4,723,211 | 2/1988 | Diesel et al. | 395/147 |
| 4,723,273 | 2/1988 | Diesel et al. | 379/211 |
| 4,747,124 | 5/1988 | Ladd | 379/67 |
| 4,783,796 | 11/1988 | Ladd | 379/67 |
| 4,809,321 | 2/1989 | Morganstein et al. | 379/211 |
| 4,811,381 | 3/1989 | Woo et al. | 379/67 |

(List continued on next page.)

FOREIGN PATENT DOCUMENTS

| | | |
|---|---|---|
| 2577093 | 8/1986 | France . |
| 61-39756 | 2/1986 | Japan . |

OTHER PUBLICATIONS

"CWD Feature Requirements", Dec., 1987.
McNinch, "Screen Based Telephony", Apr. 1990 IEEE Communications Magazine, pp. 34–38.
"Call Waiting Deluxe Feature", Apr., 1993.
*Star Talk Set Up and Operation Guide,* Sec. 2, "Learning About StarTalk," pp. 1–7. undated.
"Getting the Message Just Got Easier," *StarTalk,* Northern Telecom. (brochure) undated.
Chris Schmandt and Stephen Casner, "Phonetool: Integrating Telephones and Workstations," *IEEE Communication Society,* IEEE Global Telecommunications Conference, Nov. 27–30, 1989, pp. 0970–0974.
"The CallXpress3 CallServer Family", Applied Voice Technology. (brochure) undated.
"The VMX Desktop Product", VMX, Inc. (brochure) undated.
"Repartee", Active Voice Corporation. (brochure) undated.
*"One View* for Windows", Centigram Communications Corporation. (brochure) undated.
"Desktop for Windows", Applied Voice Technology. (brochure) undated.
"Announcing the Electronic Receptionist", Jan., 1993.

*Primary Examiner*—Krista M. Zele
*Assistant Examiner*—Daniel S. Hunter
*Attorney, Agent, or Firm*—Graybeal Jackson Haley

[57] ABSTRACT

A method and apparatus for an auto attendant system to allow a called party to monitor a screening name left by a caller while the called party is on the telephone with a third party. If the called party wishes, the system can place the third party on hold and connect the caller. Alternatively, the system can redirect the caller to another line or ask the caller to hold. The system is implemented with a second communication channel from the telephone switch system to the called party so that the called party can monitor the screening name left by a caller without first putting the third party on hold or disconnecting from the third party. The system can be configured to automatically monitor each screening name as it is left without intervention by the called party.

10 Claims, 3 Drawing Sheets

U.S. PATENT DOCUMENTS

| | | | |
|---|---|---|---|
| 4,866,755 | 9/1989 | Hashimoto | 379/96 |
| 4,899,358 | 2/1990 | Blakley | 379/67 |
| 4,926,462 | 5/1990 | Ladd et al. | 379/89 |
| 4,935,156 | 6/1990 | Hellwarth et al. | 379/114 |
| 4,942,598 | 7/1990 | Davis | 379/211 |
| 4,969,136 | 11/1990 | Chamberlin et al. | 379/29 |
| 4,975,941 | 12/1990 | Morganstein et al. | 379/88 |
| 4,985,913 | 1/1991 | Shalom et al. | 379/96 |
| 5,007,076 | 4/1991 | Blakley | 379/215 |
| 5,008,927 | 4/1991 | Weiss et al. | 379/98 |
| 5,027,384 | 6/1991 | Morganstein | 379/67 |
| 5,029,196 | 7/1991 | Morganstein | 379/67 |
| 5,029,198 | 7/1991 | Walpole et al. | 379/88 |
| 5,031,205 | 7/1991 | Phillips | 379/88 |
| 5,058,152 | 10/1991 | Solomon et al. | 379/196 |
| 5,127,003 | 6/1992 | Doll, Jr. et al. | 370/110.1 |
| 5,168,515 | 12/1992 | Gechter et al. | 379/765 |
| 5,228,073 | 7/1993 | Smith | 379/170 |
| 5,278,894 | 1/1994 | Shaw | 379/67 |
| 5,309,505 | 5/1994 | Szlam et al. | 379/77 |
| 5,309,512 | 5/1994 | Blackmon et al. | 379/210 |
| 5,317,630 | 5/1994 | Feinberg et al. | 379/210 |
| 5,327,486 | 7/1994 | Wolff et al. | 379/214 |
| 5,329,578 | 7/1994 | Brennan et al. | 379/67 |
| 5,347,574 | 9/1994 | Morganstein | 379/211 |

METHOD AND APPARATUS FOR MONITORING A CALLER'S NAME WHILE USING A TELEPHONE

This application is a continuation-in-part of prior U.S. patent applications Ser. No. 08/119,380 filed Sep. 13, 1993 entitled "Method and Apparatus for Processing an Incoming Call in a Communication System", now U.S. Pat. No. 5,434,906, and Ser. No. 08/125,606 filed Sep. 22, 1993 entitled "Telephone Auto Attendant System for Delivering Chosen Greetings to Callers While on the Phone", now abandoned.

TECHNICAL FIELD

This invention relates to telephone switching systems with auto attendant features.

BACKGROUND OF THE INVENTION

Some auto-attendant systems request from a caller a statement of the caller's name which is then recorded so that the called party may listen to the recording before deciding whether to take the call. The system may be deployed with a private branch exchange (PBX) switch or with a central office telephone switching system. If the called party is on the telephone or unavailable when the call comes in, the statement of the callers' name (the "screening name") is recorded along with a voice mail message left by the caller.

SUMMARY OF THE INVENTION

The invention is a method and apparatus for an auto attendant system to allow a called party to monitor a screening name left by a caller while the called party is on the telephone with a third party. Then, if the called party wishes, the called party can instruct the system to place the third party on hold and connect the caller. Alternatively, the called party can instruct the system to redirect the caller to another line or to ask the caller to hold without interrupting the called party's connection to the third party.

The system is implemented with a second communication channel from the telephone switch system to the called party so that the called party can monitor the screening name left by a caller without first putting the third party on hold or disconnecting from the third party. Preferably, the second channel is a local area network connected between the switching system and a personal computer with a sound card and speakers at the location of the called party. Information concerning the call is displayed on the computer screen and the called party enters commands to the system at the computer rather than his telephone set.

If the called party does not want to be required to use his hands to command that a screening name being left by a caller should be monitored, the system can be configured to automatically monitor each screening name as it is left without intervention by the called party.

DETAILED DESCRIPTION OF THE INVENTION

Figure 1:
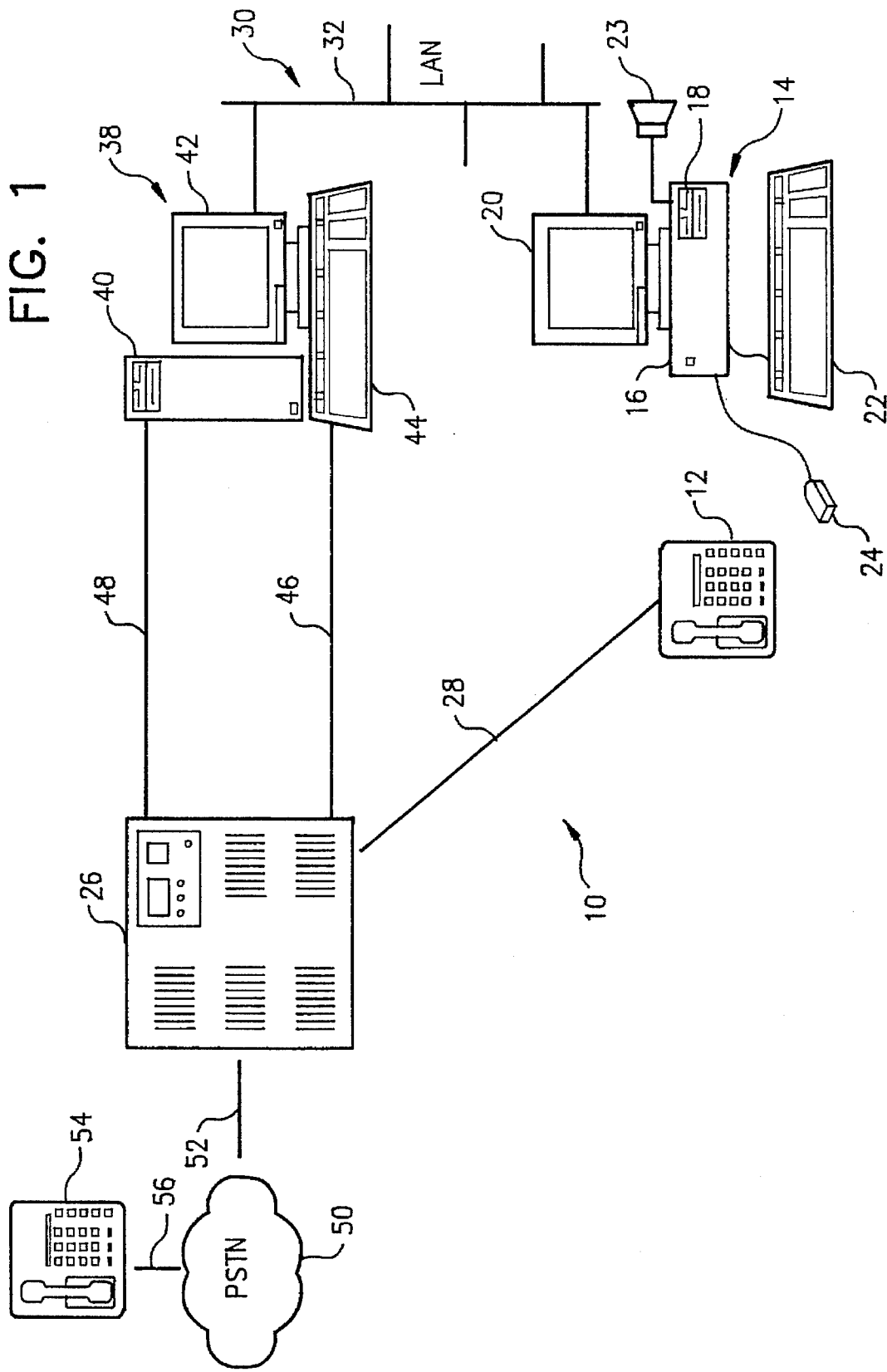
FIG. 1 is a schematic diagram showing the components for carrying out the invention.

FIG. 1 is a schematic diagram showing a first embodiment for carrying out an aspect of the invention. The first embodiment of the apparatus 10 includes a user's telephone extension 12 and a programmed personal computer 14 located near the user's telephone extension 12. The programmed personal computer 14 includes a housing 16 that encloses a conventional microprocessor (such as an Intel 486 microprocessor, not shown) and other conventional electronic circuitry associated with the microprocessor. The housing 16 also encloses one or more disk drives, including a floppy disk drive 18 and a hard disk drive (not shown) that contains the client program which the microprocessor is executing as well as data which the program requires while it is executing. The programmed personal computer 14 also includes a display 20, a keyboard 22, a speaker 23 and a pointing device 24, such as a mouse. The display 20, the keyboard 22 and the pointing device 24 are all connected to the housing 16 through conventional cables (not shown).

When the user for the user extension telephone 12 is in the vicinity of the telephone 12 and the programmed personal computer 14, it is possible for the user to use the telephone 12, to operate the programmed personal computer 14 through the keyboard 22 and the mouse 24, and to observe the display 20. The user can use the programmed personal computer 14 to see information concerning callers who are calling the user's extension telephone 12 and to issue commands to the programmed personal computer 14 to handle the telephone calls by the callers or play the caller's screening name.

The telephone 12 of the system 10 is connected to a private branch exchange (PBX) 26 through a first communication channel 28 that can carry the voice of a caller to the user (called party). The programmed personal computer 14 is connected to a local area network (LAN) 30 that includes an interconnecting bus 32 to which a call processor 38, configured to provide auto attendant and a server, is connected. The programmed client personal computer 14 and the server communicate directly with each other using a client-server protocol, such as remote procedure calls, in accordance with conventional LAN operation. The communications protocol incorporates a remote procedure call (RPC) over Named Pipes or TCP/IP.

The call processor and server system 38 includes a programmed personal computer 40 with a voice board, such as supplied by Dialogic of New Jersey or Rhetorex of California (not shown), a display 42, and a keyboard 44 which are connected to the programmed personal computer 40 in a conventional manner. The personal computer 40 runs the IBM OS/2 operating system and is programmed to cause the call processor system 38 to function as a auto attendant system. The voice board inside the computer 40, in turn, is connected to the PBX 26 through a bidirectional link 48 that carries telephone PBX signalling and voice data. Optionally, the call processor system 38 and the PBX 26 can also be interconnected with a bidirectional (OAI) digital link 46.

The bidirectional link 48, (with or without the OAI link 46), and the interconnecting bus 32 form a second, bidirectional communication channel that carries information between the telephone switch and the user.

The PBX 26 is connected to the public switched telephone network (PSTN) 50 through a standard telephone line 52. The telephone network 50 can be accessed by a caller from an outside telephone 54 through the line 56.

When in use, the system 10 (see FIG. 1) will operate as follows. A caller at the outside telephone 54 will dial the telephone number of the user, which will connect the outside telephone 54 to the telephone network 50 through the line 56. The network 50 will then connect the outside telephone 54 to the PBX 26 through the line 52. The PBX 26 will cause the caller on the outside telephone 54 to interact with the call processor system 38. The call processor 38, acting as an autoattendant system, will prompt the caller to state his or her name, record the name, and cause the client computer 14 to display appropriate information on its display 20 for the user to read.

When a caller requests a connection to a called party's extension the system sends a notification to the called party via the local area network and begins recording the caller's name. The original voice data is converted from analog to digital and accumulated in a 8K buffer on the voice board before being recorded to the disk and available for playback to the called party.

Figure 2:
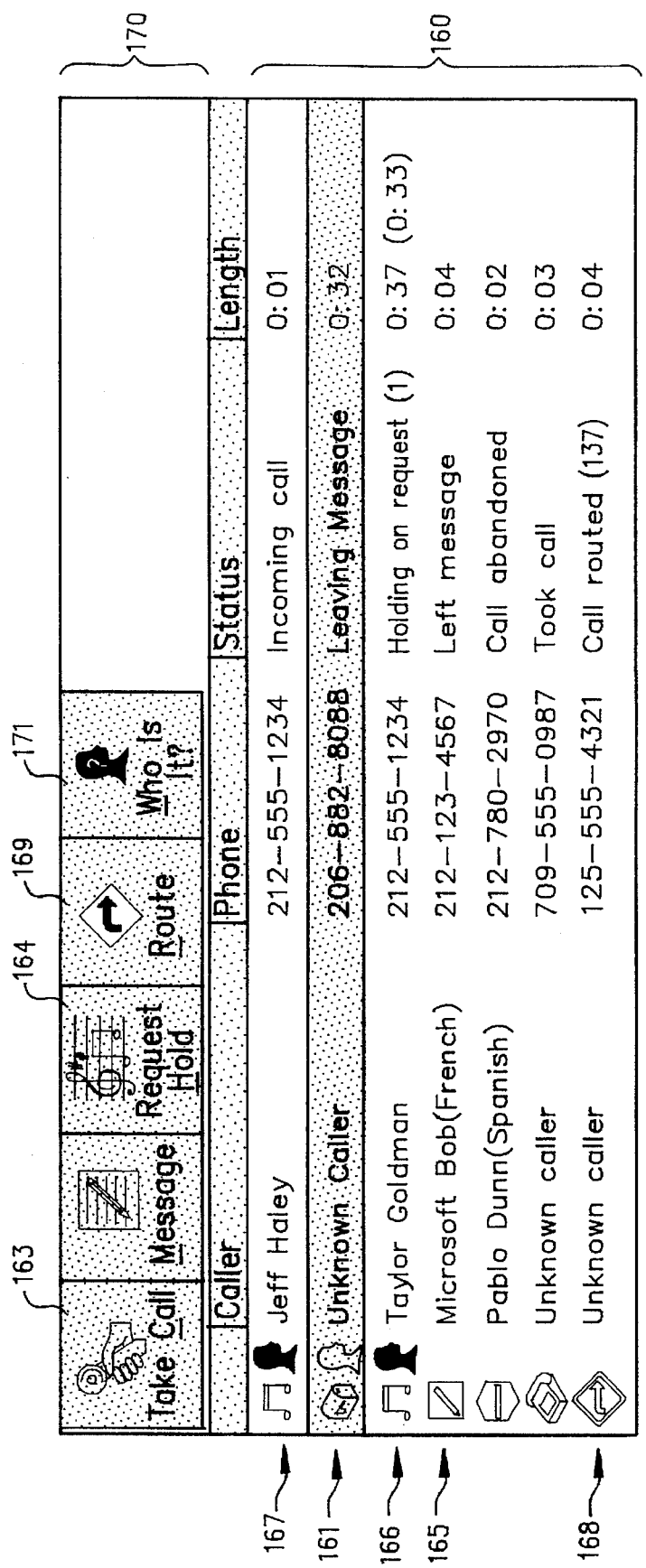
FIG. 2 is a view of a window which is produced in the use of the invention.

When the called party's personal computer receives the notification of receipt of a call, the personal computer displays a line of information 167 in a call information field 160 as shown in FIG. 2. The words displayed are "Incoming Call". The screen display shown in FIG. 2 displays information about all calls to the system directed to the called party's extension.

Within the display, a tool bar 170 shows each of the functions that can be performed with respect to any call in the call information field 160 which has been highlighted by the user. Selecting the "Who Is It" button 171 by using the pointing device 24 allows the called party hear, via the PC speaker 23, the recorded screening name for any call in the list, even if it is too late to take the call. Selecting the "Take Call", "Request Hold", or "Route" buttons by using the pointing device 24 allows the called party to effect those actions with respect to a call that has not yet been disposed of.

When sounds come from the PBX on voice line 48, the speech is transformed to digital form under the Dialogic adaptive differential pulse code modulation (ADPCM) algorithm (available from Dialogic Corporation, Parsippany, N.J.) and stored in an 8K buffer on the Dialogic board. When the buffer is full, its contents are written to a file, opened under the operating system for both read and write, on the hard disk in the server using a first thread of the server software. For transmission across the network after a screening name has been left, the voice data is read off the hard disk by a second thread of the server software. The speech file is then received by the user's personal computer 14, converted to the file format known as the Waveform audio file format specification provided by Microsoft Corporation, and played according to the multimedia file format specifications of the Microsoft Windows environment. These file format specifications are described in the Multimedia Programmer's Reference, available from the Microsoft Corporation, Redmond, Wash.

The sound data received by the client was sampled at 6000 Hz and may be easily converted from digital to analog at the same rate. If the sound card in the personal computer can operate at this rate, no interpolation is required. Many sound cards cannot operate at this rate, but can operate at 11,025 Hz. In this case, the data is interpolated to produce sound data suitable for playback at 11,025 Hz.

The server asks the caller "who may I say is calling?" and instructs the telephone card to receive the screening name from the caller. At the same time, the server notifies the client that the caller is waiting to be connected and specifies the ID of the file in which the screening name will be recorded. The telephone card receives the voice sounds from the caller, converts the signal from analog to digital, and outputs the voice sounds to the server. Although the A to D conversion could be at any sampling rate between 2000 Hz and 44,000 Hz, the voice board used samples at a rate of 6000 Hz. The voice data is output by the voice board in packets of 8K each as soon as an 8K buffer on the voice board is filled, which requires about 2 seconds. The delay may be reduced by reducing the size of each packet output by the voice board. The server receives the voice sounds in 8K packets from the telephone card and records them on the disk in the file whose ID was already provided to the client.

Upon receiving notification from the server, the client displays the notification to the called party with the status notation "Incoming Call", and awaits a command from the user. Upon receiving from the user a command to monitor the screening name, the client software forwards the command to the server. Upon receiving the monitor command, the server software uses a second thread to read the disk in 4K packets and send the packets across the network to the client. Upon receipt of the packets, the client places the packets one after another in a buffer. In the standard configuration, each packet transmitted on the network contains enough data for about 1 second of playing.

If the client begins to play the sound data upon arrival and conversion of the first packet, it may run out of data to play because of time required to convert the data to playable form or delays due to heavy network traffic. Therefore, it waits to begin playing until there is enough data in a queue for 2 seconds of playing. This is a sufficient quantity of data in the queue to avoid gaps during playback in most circumstances. The amount of data in the queue can be changed if the user experiences gaps.

Some users may wish to always monitor all screening names as they are left. For this reason, the system can be configured by the user to automatically monitor each screening name without a request by the user for monitoring.

In conventional auto attendant systems, a caller interacts with the system through a "conversation" which consists of voice playback from the auto attendant system and DTMF, voice, or other input from the caller. The conversation consists of individual "states" where each "state" is a single exchange between the auto attendant system and the caller (the auto attendant system plays a prompt to the caller, and the caller optionally responds with a DTMF or voice command). The conversation proceeds through these states according to a pre-defined sequence, allowing for control of the system by the caller. This sort of operation is well understood and widely used in auto attendant systems today.

A complication arises with the introduction of a second channel of communication from the auto attendant system to the called party. This introduces the possibility that the called party may, via the second channel, interrupt the ordinary flow of the conversation and direct the auto attendant system to say something different to the caller at any time, effectively instructing the auto attendant system to move directly to a different state than it otherwise would.

Figure 3:
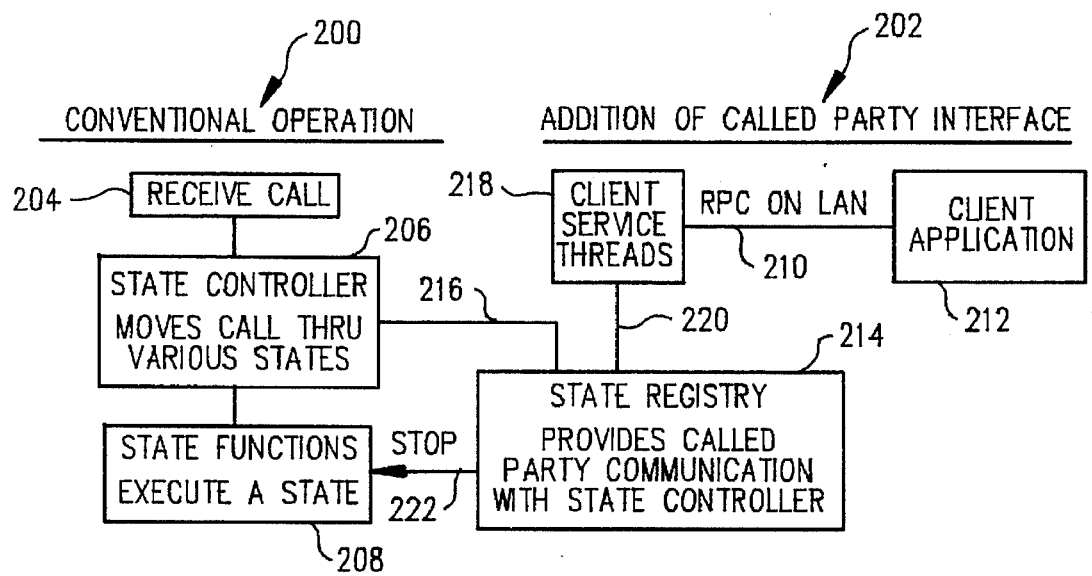
FIG. 3 is a schematic diagram of the operation of a conventional auto attendant system together with the operation of the additional system for coordinating the called party commands with the on-going conversation.

FIG. 3 is a schematic diagram of the operation of a conventional auto attendant system 200 together with the operation of an additional system 202 for coordinating the called party commands with the on-going conversation.

In the conventional auto attendant system 200, the call is received (block 204), and the conversation is controlled by some state controller 206 which calls various state functions (block 208) to execute individual states with the caller. Each state function 208 performs its task and returns the results to the state controller 206. The state controller 206 determines which state to execute next, based on the pre-defined sequence of the conversation and the results of the previous state.

The first requirement for the added called party interface 202 is some form of communication link from the caller to the called party. In the first embodiment, the communications link to the called party is accomplished via Remote Procedure Calls (RPC) 210 over a Local Area Network (LAN) to an application program running on the called party's personal computer (PC) 212.

The application on the PC 212 can then interact with the auto attendant system 200 via an Application Programming Interface (API) described below. The called party API includes the functions described below which meet three requirements:

1) To allow a called party to "log on to" or "establish a session with" the auto attendant system 200 to indicate that the called party wants to be notified of transfers to the auto attendant box and optionally to send the auto attendant system 200 commands to handle the call(s), and to "log out" or "terminate a session."

2) To notify the called party of transfers to the auto attendant box and continue to notify the called party of the progress of the call through various states. When a session is established, the called party application registers the address of a callback function with the auto attendant system 200. The callback function is used by the auto attendant system 200 to notify the called party about transfers to the auto attendant box and call states. The auto attendant system 200 invokes the callback function each time a call for the called party enters a new state. Each notification includes a "call handle" to identify the call to which the notification applies. When the called party application first sees a new call handle, it logs a new call. The notification also includes a value indicating the current state of the call.

3) To allow the called party to send commands to the auto attendant system 200 to affect the flow of the caller conversation, such as a change state command. Commands from the called party application to the auto attendant system include a pointer to a call handle, a value indicating the state the called party wishes to move the call to, and a pointer to a block of parameters with additional information about the state to be moved to, such as an indication of which of several greetings the called party would like to have played to the caller.

All of the functions in the API return a success code to indicate that the function succeeded or a failure code to indicate the function failed and the reason for the failure. Each of these codes has a defined meaning for each function. For example, the change state command returns zero (0) to indicate the command was accepted by the auto attendant system 200, one (1) to indicate that the command was rejected by the auto attendant system 200 because the call has terminated (the caller hung up), or other values to indicate other reasons for the command being rejected by the auto attendant system 200, or other reasons for failure of the function, such as the LAN communication being lost.

The coordination of the called party interface with the conventional conversation interface is accomplished through a "state registry" object 214. Whenever a called party establishes a session with the auto attendant system 200, the state registry object 214 logs that called party in to be notified of any calls and any call state changes for that called party.

The state controller 206 in the conventional conversation notifies the state registry object 214 of each new call received and each state transition for each call (path 216). At the conclusion of each call state, the state controller 206 also queries the state registry object 214 to see if the called party has requested a state change.

When the state registry object 214 receives notification of a call state change from the state controller 206, it checks whether the called party has established a session to receive call notification. If so, it invokes the callback function to notify the called party of the call state change, using a separate "client service thread" 218 (via path 220), to avoid holding up the execution of the state controller's process.

When the state registry object 214 receives a request to change the state of a call from the called party (via the client service thread 218), the state registry object 214 stores the state change request and delivers it to the state controller 206 when the state controller 206 queries for it at the conclusion of the current call state.

In order to speed the execution of called party state change requests, the state registry object 214 may also send a signal or command to the function executing the current state (path 222) to tell it to stop executing the current state and return immediately to the state controller 206.

This structure of separate client service threads 218 and the separate state controller 206 communicating via the state registry object 214 allows the called party RPC interface 210 and the caller conversation to proceed independently, but also allows for coordination of called party commands with the caller's conversation.

While the foregoing description has explained the method of alternative embodiments of the invention in detail, those skilled in the art will appreciate that there are a number of other embodiments for accomplishing the method and apparatus of the present invention. Accordingly, the scope of the invention is to be determined only by the following claims.

We claim:

1. A method, in a telephone switching system with an autoattendant, for the system to transmit to a called party a recording of a caller's name stated by a caller while the called party is using a first communication channel for a call with a third party and allow the called party to hear the recording of the caller's stated name, comprising:

receiving voice sounds from the caller, (b) recording the voice sounds, (c) notifying the called party with a visual notification on a display that the system is receiving and recording voice sounds from the caller, (d) awaiting a responsive command from the called party, and, (e) upon receipt from the called party of a command to do so, transmitting the voice sounds to the called party via a second communication channel and playing the voice sounds on a speaker coupled to the second channel.

2. The method of claim 1 wherein the second communication channel comprises a connection from the autoattendant to a personal computer at the location of the called party and the voice sounds are played to the called party via a speaker connected to the personal computer.

3. A method, in a telephone switching system with an autoattendant, for the system to transmit to a called party recordings of callers' names stated by callers while the called party is using a first communication channel for a call with a third party and allow the called party to hear the recordings of the callers' stated names, comprising:

(a) receiving first voice sounds from a first caller, (b) recording the first voice sounds, (c) transmitting the first voice sounds to the called party via a second communication channel, (d) playing the first voice sounds on a speaker coupled to the second channel, (e) while the first voice sounds are being transmitted to the called party, receiving a call from a second caller, receiving second voice sounds from the second caller, and recording the second voice sounds; and (f) after the first voice sounds have been transmitted to the called party, transmitting to the called party the second voice sounds.

4. The method of claim 3 wherein the voice sounds received from the second caller are transmitted to the called party while the autoattendant is still receiving voice sounds from the second caller.

5. The method of claim 3 further comprising:

(a) receiving from the called party via the second communication channel a selection between the first caller leaving a message and the second caller leaving a message as to which caller should receive a message to be audibly played by the autoattendant to the caller.

6. An autoattendant system which transmits to a called party a recording of a caller's name stated by a first caller while the called party is using a first communication channel for a call with a third party and allows the called party to hear the recording of the caller's stated name, comprising:

(a) means for receiving voice sounds from the first caller, (b) means for recording the voice sounds, (c) means for notifying the called party with a visual notification on a display that the system is receiving and recording voice sounds from the first caller, (d) means for awaiting a responsive command from the called party, (e) means for transmitting the voice sounds to the called party via a second communication channel upon receipt from the called party of a command to do so, and (f) means for playing the voice sounds on a speaker coupled to the second channel.

7. The autoattendant system of claim 6 wherein the second communication channel comprises a connection from the autoattendant to a personal computer at the location of the called party and the voice sounds are played to the called party via a speaker connected to the personal computer.

8. An autoattendant system which transmits to a called party recordings of callers' names stated by callers while the called party is using a first communication channel for a call with a third party and allows the called party to hear the recordings of the callers' stated name, comprising:

(a) means for receiving first voice sounds from a first caller, (b) means for recording the first voice sounds, (c) means for transmitting the first voice sounds to the called party via a second communication channel, (d) means for playing the first voice sounds on a speaker coupled to the second channel, (e) means for, while the first voice sounds are being transmitted to the called party, receiving a call from a second caller, receiving second voice sounds from the second caller, and recording the second voice sounds; and (f) means for, after the first voice sounds have been transmitted to the called party, transmitting to the called party the second voice sounds.

9. The autoattendant system of claim 8 wherein the voice sounds received from the second caller are transmitted to the called party while the autoattendant is still receiving voice sounds from the second caller.

10. The autoattendant system of claim 8 further comprising:

(a) means for receiving from the called party via the second communication channel a selection between the first caller leaving a message and the second caller leaving a message as to which caller should receive a message to be audibly played by the autoattendant to the caller.

* * * * *